United States Patent [19]

Lentz et al.

[11] Patent Number: 4,486,213
[45] Date of Patent: Dec. 4, 1984

[54] DRAWING LAMINATED POLARIZING GLASSES

[75] Inventors: William P. Lentz, Campbell; Thomas P. Seward, III; George C. Shay, both of Corning, all of N.Y.

[73] Assignee: Corning Glass Works, Corning, N.Y.

[21] Appl. No.: 427,510

[22] Filed: Sep. 29, 1982

[51] Int. Cl.³ .................................................. C03C 3/26
[52] U.S. Cl. ............................ 65/30.11; 65/30.1; 65/32; 65/102; 65/121; 156/294; 501/13
[58] Field of Search ............... 65/32, 121, 30.11, 30.1, 65/64, 102, 126, 3.2, 3.11, 66, 127; 156/293, 294, 102, 100, 99; 501/13

[56] References Cited

U.S. PATENT DOCUMENTS

| | | | |
|---|---|---|---|
| 2,313,296 | 3/1943 | Lamesch | 65/121 X |
| 3,582,306 | 6/1971 | Giffen | 65/121 |
| 3,630,765 | 12/1971 | Araujo | 501/13 |
| 3,653,863 | 4/1972 | Araujo et al. | 65/30.11 |
| 3,784,386 | 1/1974 | Araujo | 501/13 |
| 3,870,399 | 3/1975 | Randall | 65/3.11 X |
| 4,102,664 | 7/1978 | Dumbaugh | 65/30 E |
| 4,125,404 | 11/1978 | Araujo et al. | 65/30.11 X |
| 4,125,405 | 11/1978 | Araujo et al. | 65/30.11 X |
| 4,173,393 | 11/1979 | Maurer | 65/3.11 X |
| 4,204,027 | 5/1980 | Simon | 65/121 |
| 4,214,886 | 7/1980 | Shay et al. | 65/121 |
| 4,282,022 | 8/1981 | Lo et al. | 65/183 |
| 4,304,594 | 12/1981 | Borrelli et al. | 65/32 X |

Primary Examiner—Kenneth M. Schor
Attorney, Agent, or Firm—B. R. Turner

[57] ABSTRACT

A method is set forth for making polarizing glasses having high dichroic ratios by drawing relatively small silver-containing particles under relatively high stress and elongating such particles during the drawing process without rupturing the glass draw by coating the polarizing glass with a substantially low viscosity skin glass.

12 Claims, 2 Drawing Figures

DRAWING LAMINATED POLARIZING GLASSES

BACKGROUND OF THE INVENTION

The production of polarizing materials, especially plastic materials in sheet form, is well known in the art.

The production process generally comprehends two basic steps: first, a suspending medium containing long chain molecules, such a polyvinyl alcohol, is stretched to align those chain molecules; and, second, dichroic (polarizing) die molecules are added to (or included in) the medium which attach themselves in a manner so as to orient along the aligned chain molecules.

In an alternative two step process: first, acicular shaped light-polarizing particles are dispersed in a suspending medium; and, second, the medium is caused to flow under stress, such as by extruding, rolling, or stretching, in order to align the particles in the direction of medium flow.

Although the vast bulk of the polarizing materials marketed commercially has utilized an organic plastic as the suspending medium with organic and/or inorganic particles and/or molecules being dispersed therewithin, because of the inherent low surface hardness, relatively high moisture susceptibility, low temperature capability, and poor scratch resistance of organic plastics, investigations have been undertaken sporadically to manufacture polarizing glasses. Such research has been most active in the field of ophthalmic applications where high surface hardness and good scratch resistance are important.

Polarizing glasses have been prepared wherein very fine metallic particles and inorganic crystals have comprised the polarizing materials. Three methods for making polarizing glasses have been disclosed in the recent patent literature. U.S. Pat. Nos. 4,125,404 and 4,125,405 describe the preparation of photochromic and non-photochromic polarizing glasses effected through the irradiation of silver-containing glasses with intense polarized light. Photochromic polarizing glasses are generally clear in the undarkened state and polarizing in the darkened state. U.S. Pat. Nos. 3,653,863 and 4,282,022 disclose the manufacture of photochromic polarizing glasses via elongating, stretching or extruding the glass. U.S. Pat. No. 4,304,584 describes the preparation of polarizing glasses by elongating glasses containing silver halide particles, then heat treating said glass in a reducing atmosphere.

The first method involves subjecting a glass, wherein a silver halide selected from the group of AgCl, AgBr, and AgI constitutes the polarizing agent, to a high intensity source of linearly-polarized visible light, such as a laser, while the glass is in the darkened or colored state. The practical aspects of providing such an exposure to the glass have rendered the process intrinsically expensive and slow. Furthermore, the polarizing effect produced in this manner deteriorates on exposure to sunlight and the reported dichroic ratios are relatively low, <4.

The second method is specifically directed to photochromic glasses wherein a silver halide comprises the photochromic agent. The technique contemplates stretching or extruding the photochromic glasses, while at temperatures between the annealing and softening points of the glass, to simultaneously elongate the silver halide particles to an ellipsoidal configuration (conventionally demonstrating a length-to-width ratio, termed the "aspect ratio", ranging between about 2:1-5:1 for stretching and 2:1-30:1 for extrusion) and align the elongated particles. The elongated glass is cooled quickly to inhibit the elongated particles from returning to their original shape (respheroidizing).

The stretching technique (U.S. Pat. No. 3,653,863) is subject to several limitations. For example, the redrawing or stretching comprehends placing the glass under high tensile stress, and glass is known to be weak in tension. Consequently, although we have found that the stress necessary for good particle elongation is often at least about 3000-6000 psi, ruptures of the glass at much lower stress levels are not uncommon. A practical limit for rupture is considered to be about 1000 psi. Inasmuch as the polarizing character of the stretched glass is dependent upon the maximum stress obtained during redrawing, premature ruptures not only interrupt the process but create undesirable rejects. Another problem not infrequently encountered when applying traditional redraw procedures to polarizing glass is related to the fact that the stretching is normally conducted at relatively high temperatures, i.e., approximating the softening point of the glass, because lower stresses can be utilized at those temperatures. This action, however, creates at least two problems with photochromic glass. The first results since the photochromic properties are quite sensitive to heat treatment. Haziness and slow fading are two commonly-experienced undesirable characteristics resulting from high temperature heating in the stretching procedure. The second is that the lower stresses are often not sufficient to elongate the particles. A further problem witnessed in the re-draw process is the difficulty in controlling the shape and size of the product. The glass to be re-drawn is customarily in the form of small bars. It is well-nigh impossible to generate wide, uniformly-thin sheets of glass, such as would be useful in ophthalmic applications, since surface flaws in the glass result in the rupturing of the draw.

Nonphotochromic glasses containing silver or other metals can be made polarizing by stretching, thereby elongating the metal particles therein, but the same problems are experienced therewith as outlined above.

U.S. Pat. No. 4,282,022 discloses a method of extruding silver-containing glasses wherein the metallic silver and/or silver halide particles within the glass are elongated and aligned in the direction of glass movement. In general, the silver and silver halide particles, prior to elongation, have diameters within the range of about 80–1000 Å. The patent points out that if the extrusion process is founded essentially solely upon the presence of compressive stresses, and glass is known to be extremely strong under compression, extrusion can be carried out at very high compressive stress levels. This factor eliminates the problem of premature rupture which is encountered when applying the necessary stretching tensile stresses during a redraw operation. Thus, superior polarizing characteristics theoretically can be obtained with an extrusion process, since extrusion permits the use of higher stress levels.

The extrusion is conducted at such elevated temperatures that the glass is at a viscosity of between about $10^8$–$10^{13}$ poises, i.e., at temperatures between about the annealing point and the softening point of the glass, and at such pressures that the cross-sectional area of the glass in the extrusion chamber is reduced by a factor of at least 4 and up to 80 or more in the extrudate. Under the influence of those temperatures and pressures the silver and/or silver halide particles will be elongated to assume an oblate or prolate geometry with aspect ratios of at least 2:1 and up to 30:1 and greater. The photochromic glasses are also generally clear in the undarkened state and polarizing in the darkened state, while the glasses containing silver metal are always polarizing.

However, various problems are encountered with the extrusion process including a tendency for the elongated particles to return to their original shape (respheroidize) as the glass flows from the extrusion chamber, unless necessary precautions are taken. In addition, the flow of a charge in an extrusion chamber is not uniform, since the center portion thereof tends to flow more rapidly than the portion closer to the chamber and orifice walls, due to the friction of such walls. Further, the orifice serves as a heat sink for the charge which has a tendency to affect that glass closer to the walls than that centrally thereof, and accordingly the stresses generated during the extrusion process and the resulting polarizing properties are not necessarily uniform across the cross-sectional area of the extrudate. Further, although extremely high hydrostatic pressures can be developed in an extrusion chamber, it is essentially impossible to transform this pressure into an equivalent extensional stress on the particles in the glass, regardless of the extrusion orifice or die design. Also, it is extremely difficult to extrude wide, thin sheets of glass.

U.S. Pat. No. 4,304,584 describes the production of glasses exhibiting polarizing properties, i.e., glasses displaying dichroic ratios up to 40 and higher, from two types of silver-containing glasses: (1) phase separable glasses; and (2) glasses demonstrating photochromic behavior because of the presence of particles of a silver halide selected from the group of AgCl, AgBr, and AgI. The method for preparing the polarizing glasses contemplates two fundamental steps: (a) elongating or stretching the base glass articles under stress via such methods as redrawing, extruding, rolling, or stretching at temperatures between the annealing point and softening point of the glasses to cause the glass phases in the phase separable glasses or the silver halide particles in the photochromic glasses to become elongated and aligned in the direction of the stress; and (b) heat treating the elongated glass articles in a reducing environment at a temperature below the annealing point of the glasses, but above about 300° C., to reduce at least a portion of the silver ions in the glass to metallic silver which is deposited in at least one of the elongated glass phases and/or along the phase boundaries of the elongated glass phases and/or deposited upon the elongated silver halide particles. The most efficient heat treatment is stated to comprise a temperature between about 375°-450° C. in a hydrogen atmosphere. Polarization was discerned in the visible and near infrared portions of the radiation spectrum. When photochromic glasses are made polarizing in this manner the non-reduced particles in the bulk of the glass retain their photochromic properties. Co-pending application Ser. No. 427,732, entitled Infrared Polarizing Glasses, filed simultaneously herewith, teaches how to eliminate this photochromism in cases where it is not wanted.

The U.S. Pat. No. 4,304,584 also discloses the production of composite bodies formed via concurrent extrusion of different glass compositions, such practice being operable with both phase separable glasses and photochromic glasses. In general, the composite body will consist of a thin surface layer or skin enveloping a thicker interior portion or core.

Thus, with respect to silver halide-containing photochromic glasses, it had been recognized in the art that the subjection of such glasses to high temperatures led to the growth of relatively large silver halide particles, the dimensions of the particles becoming so large as to cause light scattering with the consequent development of a hazy appearance. It was found, however, that the larger particles required less mechanical stress to effect the elongation thereof, and resisted the tendency to respheroidize to a much greater extent. Accordingly, it was deemed useful to form a laminated article comprising a thin skin glass which has been subjected to a relatively high heat treatment to generate large silver halide crystals therein and an interior portion that has been subjected to a less severe heat treatment to produce a transparent photochromic glass. Subsequent elongation of the composite body results in a thin skin exhibiting high polarization and a transparent core displaying good photochromic behavior. And, because the cross section of the skin glass is very thin, any haze developed therein will customarily have very little effect upon the optical transmission of the composite. If photochromism is not wanted, the core could of course be made of a non-photochromic glass.

Since the polarization derived from the heat treatment conducted under reducing conditions of the U.S. Pat. No. 4,304,584 is normally limited to a thin surface layer, typically 10-100 microns, the phase separable or photochromic glass need only comprise the surface layer of the composite. Hence, only the skin layer is required to be elongated uniformly, since the size, shape, and alignment of the particles in the core glass have little effect upon the polarization character of the final product.

It is apparent that the U.S. Pat. No. 4,304,584 was concerned with the utilization of relatively large silver halide particles within a thin skin glass of a composite body, since the large particles required less mechanical stress to effect the elongation thereof and further, since such particles resisted the tendency to respheroidize. However, we have observed that higher dichroic ratios of greater than 15:1 and even exceeding 60:1, representing increased polarization, are obtainable by elongating relatively small silver particles having a diameter of less than about 500 Å. Further, we have learned that it is necessary to utilize particles having a diameter of less than about 500 Å and preferably less than 200 Å in order to eliminate the effects of light scattering, which is produced by larger particles, and which cannot be tolerated in many optical and ophthalmic applications.

We have further learned that if the particles are in the form of silver-halide, haze levels suitable for optical and ophthalmic applications can be achieved if the particle sizes are less than 200 Å in diameter. Also, dichroic ratios in excess of 40 can be achieved when silver halide particles less than 600 Å diameter are elongated and reduced to silver metal by heat treatment in a reducing atmosphere.

One problem, however, encountered with the utilization of such smaller particles of 500 Å or less, is the fact that higher stresses, often greater than 10,000 psi, are required to elongate such particles to a degree necessary to provide the desired high dichroic ratio, which may be on the order of 40 or greater. In contrast, normal redraw operations may be performed under stresses of less than 1000 psi, and when the stress is increased above 1500 psi the glass has a tendency to rupture or break during the redraw process.

It thus has been an object of the present invention to provide an improved method of drawing or redrawing glass having silver or silver halide particles of less than about 500 Å or 200 Å, respectively, with tensile stresses of greater than 2500 psi so as to elongate said silver or silver halide particles, hereinafter called silver-containing particles, without rupturing or breaking the glass draw.

SUMMARY OF THE INVENTION

In its simplest form, the present invention sets forth a method of making polarizing glasses having high dichroic ratios by drawing glass having relatively small silver-containing particles under relatively high stress and elongating such particles during the drawing process without rupturing the glass draw. In view of the fact that breakage or rupture of the draw is usually the result of a concentration of tensile stresses adjacent to a surface flaw, the potentially polarizing glass is coated with a glass of substantially lower viscosity so that during the elongation process, very little tensile stress will exist at the surface of the draw, thereby virtually eliminating such breakage.

DESCRIPTION OF THE PREFERRED EMBODIMENT

Figure 1:
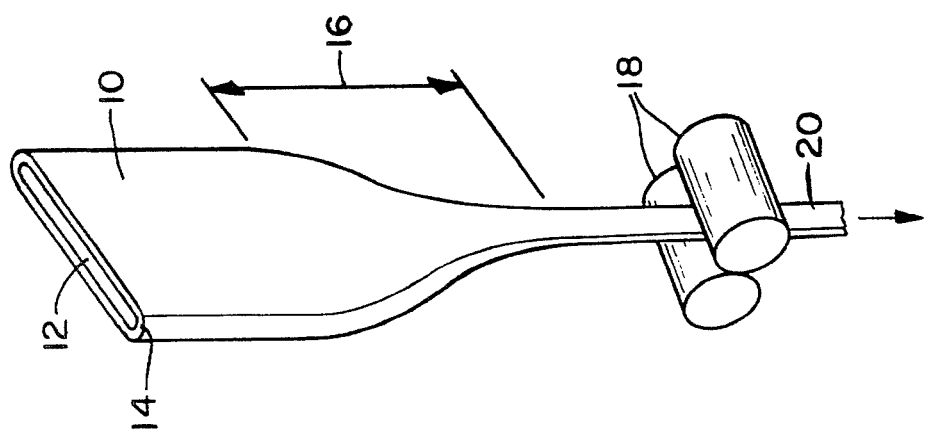
FIG. 1 is a schematic perspective view illustrating the drawing of laminated polarizing glasses in accordance with the present invention.

Referring now to the drawings, and particularly FIG. 1, a schematic illustration of a glass drawing process embodying the present invention is shown. Although the drawing process is shown with respect to a redraw blank, the drawing and stretching of the laminated polarizing glasses is equally applicable to the drawing of molten laminated polarizing glasses emanating from a composite glass feeder such as disclosed in U.S. Pat. No. 3,582,306 or laminated sheet glass formers disclosed in U.S. Pat. Nos. 4,204,027 and 4,214,886. The redraw blank 10 is shown comprising a potentially polarizing core glass 12 and a skin glass 14. The blank 10 passes through a hot zone of a redraw furnace represented by arrow 16, wherein the blank is heated and stretched under tension by pulling rolls 18 into a laminated polarizing glass sheet or strip 20.

During the drawing process, the skin glass temperature is generally maintained near or above its softening point temperature until the glass is contacted by the pulling rolls 18, to thus ensure that very little tensile stress exists in the skin layer. The core glass, which is subjected to high tensile stress during the drawing process, so as to elongate the silver-containing particles to a desired aspect ratio of 2:1 or greater, is maintained at a temperature above its annealing point temperature. However, the high tensile stresses in the core glass are not permitted to be transmitted to the traditionally weak glass-air interface, due to the presence of the low viscosity skin glass, except for the very short period of time that the glass surface is in contact with the pulling rolls. The stress of stretching no longer exists within the strip 20 below the pulling rolls 18, and accordingly the low viscosity skin glass may then harden.

When working with redraw blanks, an additional benefit is obtained through the use of a low viscosity skin glass. That is, as previously mentioned, most glass breakage during drawing is the result of high tensile stresses about surface flaws, however as the skin glass passes through the hot zone of a redraw furnace, or is delivered in a molten state in a downdraw, the skin glass is sufficiently fluid so as to heal over any core glass surface flaws which may be present from the fabrication or handling of a redraw blank or due to imperfections in a discharge orifice. If it is desired to produce a strengthened polarizing glass, the softer skin glass may be made of a lower expansion than that of the core glass. Further, if the finish of the laminated sheet is important, the skin glass could be hardened above the pulling rolls so that its surface would not be marked by the rolls, and if a lower expansion skin glass were used any tensile stress at the surface would be at least partially counteracted by the compression stress arising from the difference in the expansion coefficients between the skin and the core glasses.

The skin glass could theoretically be made thin enough and of such a composition so as to permit hydrogen permeation to the outer reaches of the core glass during hydrogen firing such as disclosed in U.S. Pat. No. 4,304,584. Further, the skin glass could be formed with a composition having low acid durability such that it could be dissolved away without harming the core glass surface in a manner disclosed in U.S. Pat. No. 4,102,664. Accordingly, hydrogen firing would then be unimpeded by any skin glass thereby permitting the reduction of silver halide particles near the core glass surface to metallic silver, which yields excellent permanent polarizing properties.

The thickness of the low viscosity skin glass may be varied to provide various desired properties. From the point of view of reducing surface stress at the pulling rolls, the ratio of core thickness to total laminated thickness, B, should be small, preferably less than 1:10 or $$B = \frac{t_c}{t_l} < 1:10$$

where B is the ratio of the core thickness to the total laminated thickness, $t_c$ is the thickness of the core, and $t_l$ is the total laminate thickness. When B is a relatively low value, a close thermal expansion match between the core and skin glass is required to maintain low residual tensile stress in the core glass, which is necessary to avoid spontaneous breakage in the final product during use. On the other hand, at relatively high B values, larger thermal expansion mismatches may be tolerated and in fact can be used to provide surface compressive stress for strengthening the product.

To illustrate how the laminated article materially reduces the overall tensile stress in the article during stretching while still maintaining relatively high tensile stress in the core for elongating the silver-containing particles, one can envision a polarizing sheet having a 0.002" thick silver containing core glass and skin glasses having a thickness of 0.010" each, thus giving an overall sheet thickness of 0.022". If the laminated ribbon were 1" wide and the stress necessary for particle elongation were 4000 psi, then the force necessary to stretch only the core would be 0.002 × 1 × 4000 which equals 8 lbs. Accordingly, if the skin glass viscosity is 1000 times less than the core glass, the force to stretch the two skin layers would only be:

$$8 \times \frac{0.020}{0.002} \times \frac{1}{1000} = 0.08 \text{ lbs.}$$

If the skin glass were hardened before passing through the pulling rolls, the tensile stress in the hardened glass ribbon at that point would be:

$$\frac{8.08}{0.022 \times 1} = 3.67.3 \text{ psi}$$

Therefore, utilizing the concept of the present invention, a stress of 4000 psi is produced in the polarizing glass while producing only a 367 psi stress at potential breakage sites at the surface of the low viscosity skin glass. Perhaps almost as importantly, however, the process is capable of producing excellent polarizing sheet using very low pulling forces at the pulling rolls. For example, under the above described conditions of core and skin glass thickness and relative viscosities, a 60" wide polarizing sheet could be drawn with a pulling force of 60×8.08 or only 485 lbs. compared to 5,280 lbs. if the core glass occupied the entire sheet thickness. Thus, it is entirely feasible that such forces could be used in producing laminated polarizing sheet glass from molten downdraw and overflow sheet forming apparatus in a continuous process.

Figure 2:
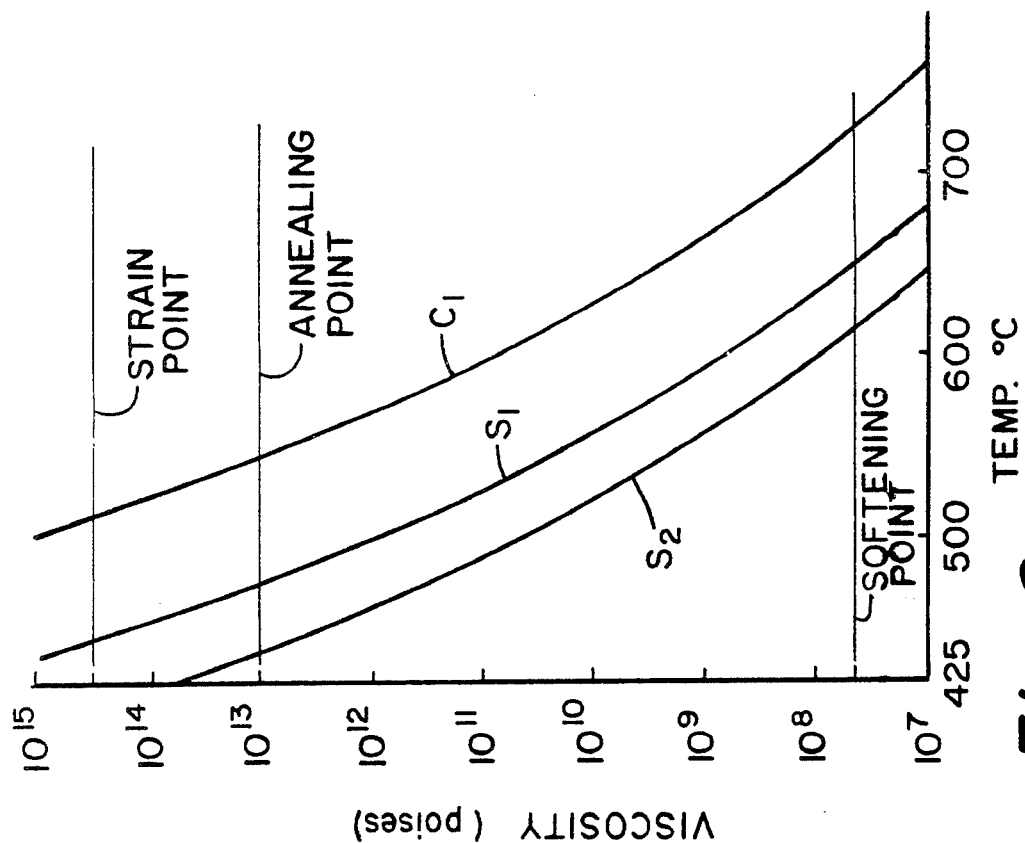
FIG. 2 is a graph illustrating relative viscosities between core and skin glasses.

FIG. 2 illustrates viscosity curves of two skin glasses $S_1$ and $S_2$ that could be used with a core glass $C_1$ which contains silver particles. The skin glass $S_2$ has almost the same coefficient of thermal expansion as the silver particle-containing core glass $C_1$, but is softer by a factor of about 1000 at its own softening temperature. The skin glass $S_1$ would provide strengthening to the core glass $C_1$ since its coefficient of thermal expansion is about 30% less than that of the core glass $C_1$. The viscosity of the low viscosity skin glass at the softening point temperature of the core glass should be at least 50% less than that of the core glass so that the tensile stresses during drawing and elongation of the laminated glass will be minimal in the skin glass while sufficiently large in the core glass so as to elongate the silver containing particles to an aspect ratio of at least 2:1 and preferably greater. Preferably, from the point of view of concentrating the particle elongation load in the core glass and minimizing glass surface stress during redraw, it is desirable that the skin to body viscosity ratio measured at the softening point of the body glass be equal to or less than $10^{-2}$. That is:

$$\frac{\eta_s}{\eta_b} \leq 10^{-2}$$

wherein $\eta_s$ is the viscosity of the skin glass and $\eta_b$ is the viscosity of the body or core glass. The required ratio will depend on both the redraw stress required and the surface stress that can be tolerated.

Virtually any glass containing silver metal particles may be made polarizing if it is stretched at a temperature near its softening point (i.e, $\eta = 10^{-7}$ to $10^{-10}$ poises) with sufficient tensile stress to elongate the particles. Also, most photochromic glasses containing silver halide can be made polarizing in either their photolytically darkened or hydrogen reduced states by similar processing. As previously mentioned, higher dichroic ratios are obtained when the silver particles are relatively small with a diameter of 500 Å or less. However, the elongation of such particles requires the stretching of a glass under stresses exceeding 2500 psi, and often greater than 10,000 psi, and thus the laminated glass of the present invention facilitates the application of such stresses without breakage of the glass during drawing. The dichroic ratio DR is defined in the following formula:

$$DR = \frac{\text{Log } (1/T_{\parallel})}{\text{Log } (1/T_{\perp})}$$

wherein DR is the dichroic ratio, $T_{\parallel}$ is the transmission of the glass for linearly polarized light with its electric vector oriented parallel to the glass stretch axis and $T_{\perp}$ is the transmission of the glass with a perpendicular orientation. Utilizing relatively small silver particles and elongating the same with the present invention to an aspect ratio of 2:1 or greater, dichroic ratios at the absorption peak exceeding 60 are possible.

As previously mentioned, the essence of the invention is to provide a means for protecting the surface of the polarizing glass while it is being stretched, by encasing or cladding the potentially polarizing core glass with a much softer skin glass. To explain this relationship more quantitatively, the stress in the skin glass $\sigma_s$ is given by the following formula:

$$\sigma_s = \frac{\eta_s}{\eta_b} \cdot \sigma_r$$

wherein $\eta_s$ is the viscosity of the skin glass, $\eta_b$ is the viscosity of the body or core glass, and $\sigma_r$ is the required stretching stress. If, for example, $\sigma_r$ equals 5000 psi and if $\sigma_s$ must be kept below 1000 psi for processing purposes, then $\eta_s/\eta_b \leq 0.2$. If, for a further example, the required $\sigma_r$ is 50,000 PSI, then $\eta_s/\eta_b \leq 0.02 = 2 \times 10^{-2}$. Consequently, the viscosity of the skin glass, at or near the softening point temperature of the core glass, should be at least 50% less than that of the core glass, and preferably, for developing very high redraw stresses, the skin should be $<1/100$ as viscous as the core glass. In contrast, a skin glass which is stiffer than the core glass would produce inoperable results. That is, if $\eta_s/\eta_b = 5$, then for $\sigma_r = 5000$ psi, $\sigma_s$ would equal 25,000 psi, and the glass would frequently break during the stretching operation.

Although virtually any softer skin glass would provide the desired beneficial results in accordance with this invention with any core glass having silver-containing particles, preferably the coefficient of expansion of the skin and core glasses are matched to prevent the development of residual stress when the polarizing glass is cooled to room temperature. However, a compressive stress in the cladding may be utilized to provide some strength benefit in certain product applications. The following table sets forth illustrations of specific core and skin glasses which may be utilized in accordance with this invention.

TABLE I

|  | Polarizing Core Glass | | Polarizing Core Glass | | Photochromic Polarizing Core Glass | | Polarizing Core, Photochromic Skin | |
|---|---|---|---|---|---|---|---|---|
|  | $C_1$ | $S_1$ | $C_2$ | $S_2$ | $C_3$ | $S_3$ | $C_4$ | $S_4$ |
| Wt. % | | | | | | | | |
| $SiO_2$ | 72.5 | 58.6 | 72.0 | 55.8 | 58.6 | 51.7 | 58.6 | 51.7 |
| $B_2O_3$ | 0 | 17.5 | 0 | 0 | 18.3 | 31.0 | 18.3 | 31.0 |
| $Al_2O_3$ | 2.0 | 11.5 | 2.0 | 2.0 | 9.5 | 7.8 | 9.5 | 7.8 |
| $Li_2O$ | 0 | 2.0 | 0 | 0 | 1.9 | 0 | 1.9 | 0 |
| $Na_2O$ | 15.5 | 6.7 | 18.0 | 10.8 | 1.7 | 9.5 | 1.7 | 9.5 |
| $K_2O$ | 0 | 1.5 | 0 | 0 | 9.8 | 0 | 9.8 | 0 |
| CaO | 10 | 0 | 8.0 | 0 | 0 | 0 | 0 | 0 |
| PbO | 0 | 2.2 | 0 | 31.4 | 0.12 | 0 | 0 | 0 |
| SnO | 0.2 | 0 | 0.2 | 0 | 0 | 0 | 0.2 | 0 |
| Ag | 0.025 | 0 | 0.025 | 0 | 0.32 | 0 | 0.025 | 0.09 |
| Cl | 0 | 0 | 0 | 0 | 0.30 | 0 | 0 | 0.26 |
| Br | 0 | 0 | 0 | 0 | 0.15 | 0 | 0 | 0.60 |
| CuO | 0 | 0 | 0 | 0 | 0.016 | 0 | 0 | 0.03 |
| F | 0 | 0 | 0 | 0 | 0 | 1.2 | 0 | 1.2 |
| CdO | 0 | 0 | 0 | 0 | 0 | 0 | 0 | 0.9 |
| Soft. Pt. (°C.) | 720 | 648 | 688 | 614 | 665 | 624 | 665 | 624 |
| Anneal Pt. (°C.) | 551 | 482 | 525 | 445 | 500 | 435 | 500 | 435 |
| Strain Pt. (°C.) | 514 | 447 | 483 | 408 | 467 | 399 | 467 | 399 |
| Exp. (0–300° C.) $\times 10^{-7}/°C.$ | 91.6 | 64.0 | 97.6 | 89.0 | 66.9 | 62.6 | 66.9 | 62.6 |
| Density ($gm/cm^3$) | 2.50 | 2.37 | 2.49 | 3.12 | 2.34 | 2.22 | 2.34 | 2.22 |

Although not limiting in nature, the following specific example sets forth one embodiment of the present invention. A core glass having a composition as set forth as $C_2$ in the above table was provided with a skin glass of a composition set forth as $S_2$ in said table, to form a redraw blank. The blank was comprised of a core having a thickness of 0.112" and a width of about 2½" surrounded by the skin glass having a thickness of 0.125". The redraw blank was heated to the softening point temperature of the core glass which produced a viscosity of $5 \times 10^7 P$ whereas the skin glass had a viscosity at such temperature of $3 \times 10^6 P$ which is 16.7 times less than that of the core glass. The core was subjected to a pulling load and drawn down into a laminated polarizing glass strip at a tensile stress of about 9,600 PSI. The silver-containing particles were initially about 380 Å in diameter and were elongated to an aspect ratio of 2.9:1, and the resulting product produced a polarizing glass having a dichroic ratio of 37 (measured at 630 nm).

Although we have set forth the now preferred embodiments of the present invention, it will be apparent to those skilled in the art that various changes and modifications may be made thereto without departing from the spirit and scope of the invention as defined in the appended claims.

We claim:

1. A method of making a polarizing glass including the steps of providing a core glass having silver-containing particles, cladding said core glass with a skin glass to form a laminated glass, said skin glass having a viscosity, when at the softening point temperature of the core glass, which is at least 50% less than that of the core glass, stretching the laminated glass at a temperature above the annealing point temperature of said core glass, at or above the softening point temperature of the skin glass, and at tensile stresses within the core glass exceeding 2000 psi, and elongating said silver-containing particles to an aspect ratio of at least 2:1 so as to provide a polarizing glass having a haze level suitably low for optical and ophthalmic applications.

2. A method of making a polarizing glass as defined in claim 1 including the step of providing a core glass having silver-containing particles with diameters less than 500 Å.

3. A method of making a polarizing glass as defined in claim 1 or 2 including the steps of providing silver-containing particles in the form of metallic silver, and elongating said silver-containing particles to provide a dichroic ratio of at least 15:1.

4. A method of making a polarizing glass as defined in claim 1 or 2 including the step of providing silver-containing particles in the form of a silver halide.

5. A method of making a polarizing glass as defined in claim 4 including the step of subjecting the drawn laminated polarizing glass to a reducing atmosphere at a temperature sufficient to reduce at least a portion of the silver halide particles to metallic silver and produce a dichroic ratio of at least 15:1.

6. A method of making a polarizing glass as defined in claim 3 including the step of elongating said silver-containing particles with an aspect ratio sufficient to produce a dichroic ratio exceeding 60:1.

7. A method of making a polarizing glass as defined in claim 1 including the steps of forming the laminated glass by simultaneously flowing said core glass and said skin glass in a molten condition from a laminating glass feeder, and simultaneously drawing said core and skin glasses to stretch and elongate said silver-containing particles with said core glass.

8. A method of making a polarized glass as defined in claim 1 including the steps of forming said laminated glass by simultaneously flowing molten core glass and molten skin glass downwardly over a forming member, and drawing such laminated glass from such member and stretching such glass during the drawing so as to elongate said silver-containing particles in the core glass and provide desired aspect ratios.

9. A method of making a polarizing glass as defined in claim 1 including the step of providing a core glass having silver-containing particles with diameters less than 200 Å, and elongating such particles to an extent such that light scattering is minimized sufficiently so as to not interfere with ophthalmic uses.

10. A method of drawing polarizing glasses and elongating silver-containing particles within such glasses under substantially high tensile stresses while inhibiting and virtually eliminating breakage of the glass during the drawing process which comprises, providing a core glass having silver-containing particles therewithin, covering the surface of said core glass with a skin glass having a viscosity lower than that of said core glass at the softening point temperature of said core glass and forming a laminated glass, drawing and stretching the laminated glass at a temperature and rate such that the core glass is subjected to tensile stresses in excess of 10,000 psi, maintaining the skin glass at a temperature above its softening point temperature and the core at a temperature above its annealing point temperature during the stretching of the laminated glass to protect the surface of the core glass and inhibit the breakage thereof, and elongating said silver-containing particles to an aspect ratio of at least 2:1 so as to provide a high dichroic ratio.

11. A method of drawing polarizing glasses as defined in claim 10 including the steps of providing a core glass having metallic silver particles therewithin, and elongating said metallic silver particles to provide a dichroic ratio in excess of 15:1.

12. A method of drawing polarizing glasses as defined in claim 10 including the steps of providing a core glass having silver halide particles, and subjecting the drawn laminated polarizing glass to a reducing atmosphere at a temperature sufficient to reduce at least a portion of the silver particles to metallic silver and produce a relatively high dichroic ratio of at least 15:1.

* * * * *